US007671136B2

(12) United States Patent
Ozawa et al.

(10) Patent No.: US 7,671,136 B2
(45) Date of Patent: Mar. 2, 2010

(54) MODIFIED POLYMERS PREPARED WITH LANTHANIDE-BASED CATALYSTS

(75) Inventors: Yoichi Ozawa, Kodaira (JP); H. Jerrold Miller, Panama City, FL (US); Koji Masaki, Fairlawn, OH (US)

(73) Assignee: Bridgestone Corporation (JP)

( * ) Notice: Subject to any disclaimer, the term of this patent is extended or adjusted under 35 U.S.C. 154(b) by 1135 days.

(21) Appl. No.: 11/243,874

(22) Filed: Oct. 5, 2005

(65) Prior Publication Data

US 2006/0025539 A1   Feb. 2, 2006

Related U.S. Application Data

(63) Continuation of application No. 10/296,082, filed as application No. PCT/US00/30875 on Nov. 10, 2000, now Pat. No. 6,977,281.

(60) Provisional application No. 60/165,169, filed on Nov. 12, 1999.

(51) Int. Cl.
    *C08F 8/30* (2006.01)
(52) U.S. Cl. .............. 525/331.1; 525/333.2; 525/374; 525/375; 525/376; 525/259; 525/102; 525/342
(58) Field of Classification Search .......... 525/332.8, 525/333.1, 333.2, 374, 375, 376, 259, 102, 525/342
    See application file for complete search history.

(56) References Cited

U.S. PATENT DOCUMENTS

| 1,223,396 A | 4/1917 | Karlsson |
| 2,227,957 A | 1/1941 | Brasse |
| 3,297,667 A | 1/1967 | Von Dohlen et al. ........ 260/82.1 |
| 3,541,063 A | 11/1970 | Throckmorton et al. .... 260/82.1 |
| 3,794,604 A | 2/1974 | Throckmorton et al. ..... 252/431 |
| 4,185,042 A | 1/1980 | Verkouw ..................... 525/332 |
| 4,461,883 A | 7/1984 | Takeuchi et al. ............. 526/139 |
| 4,751,275 A | 6/1988 | Witte et al. .................. 526/139 |
| 4,791,174 A | 12/1988 | Bronstert et al. |
| 4,816,520 A * | 3/1989 | Bronstert .................... 525/285 |
| 4,906,706 A | 3/1990 | Hattori et al. ............... 525/343 |
| 4,990,573 A | 2/1991 | Andreussi et al. ........ 525/332.3 |
| 5,064,910 A | 11/1991 | Hattori et al. ............. 525/359.1 |
| 5,066,729 A | 11/1991 | Stayer et al. ................ 525/332 |
| 5,109,907 A | 5/1992 | Stayer et al. ................ 152/654 |
| 5,227,431 A | 7/1993 | Lawson et al. .............. 525/237 |
| 5,310,798 A * | 5/1994 | Lawson et al. .............. 525/102 |
| 5,508,333 A | 4/1996 | Shimizu ..................... 524/424 |
| 5,567,784 A | 10/1996 | Wieder et al. ............... 526/164 |
| 5,844,050 A | 12/1998 | Fukahori et al. ............ 525/351 |
| 5,866,171 A | 2/1999 | Kata ........................... 425/46 |
| 5,866,650 A | 2/1999 | Lawson et al. .............. 524/572 |
| 5,876,527 A | 3/1999 | Tsuruta et al. ............... 152/541 |
| 5,916,961 A | 6/1999 | Hergenrother et al. ...... 524/572 |
| 5,931,211 A | 8/1999 | Tamura .................... 152/209.5 |
| 5,971,046 A | 10/1999 | Koch et al. ................ 152/152.1 |
| 6,117,927 A | 9/2000 | Toba et al. .................. 524/261 |
| 6,172,160 B1 | 1/2001 | Nakamura et al. |
| 6,194,505 B1 | 2/2001 | Sone et al. .................. 524/432 |
| 6,197,888 B1 | 3/2001 | Luo ........................... 525/247 |
| 6,255,416 B1 | 7/2001 | Sone et al. .................. 526/153 |
| 6,291,591 B1 | 9/2001 | Luo ........................... 525/191 |
| 6,303,692 B1 | 10/2001 | Luo ........................... 525/191 |
| 6,699,813 B2 | 3/2004 | Luo et al. ................... 502/119 |
| 6,759,497 B2 | 7/2004 | Grun et al. |
| 6,838,526 B1 | 1/2005 | Sone et al. |
| 6,897,270 B2 | 5/2005 | Ozawa et al. ................. 526/88 |
| 6,977,281 B1 | 12/2005 | Ozawa et al. ............... 525/377 |
| 6,992,147 B1 | 1/2006 | Ozawa et al. ............... 525/342 |
| 7,008,899 B2 | 3/2006 | Luo et al. ................... 502/131 |
| 7,094,849 B2 | 8/2006 | Luo et al. ................... 526/164 |

(Continued)

FOREIGN PATENT DOCUMENTS

DE           138 070        10/1979

(Continued)

OTHER PUBLICATIONS

Z. Shen, J. Ouyang, F. Wang, Z. Hu, F. Yu, and B. Qian, Journal of Polymer Science: Polymer Chemistry Edition, 1980, vol. 18, pp. 3345-3357.
H.L. Hsieh, H.C. Yeh, Rubber Chemistry and Technology, 1985, vol. 58, pp. 117-145.
D.J. Wilson, Journal of Polymer Science, Part A, Polymer Chemistry, 1995, vol. 33, pp. 2505-2513.

(Continued)

*Primary Examiner*—Ling-Siu Choi
(74) *Attorney, Agent, or Firm*—Meredith E. Hooker; Arthur M. Reginelli

(57) ABSTRACT

A functionalized polymer prepared by a process comprising the steps of preparing a pseudo-living polymer by polymerizing conjugated diene monomer with a lanthanide-based catalyst, the polymer having greater than about 85 percent in the 1,4-cis microstructure and less than about 3 percent in the 1,2- or 3,4-microstructure, and reacting the pseudo-living polymer with at least one functionalizing agent defined by the formula (I) or (II):

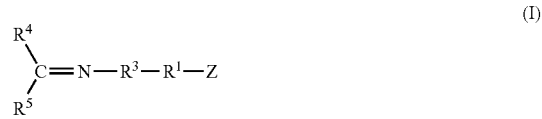

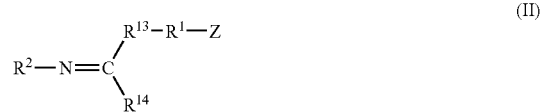

where Z is a substituent that will react or interact with organic or inorganic fillers; with the proviso that each group attached to the imino carbon is attached via a carbon atom and $R^1$, $R^2$, $R^3$, $R^4$, $R^5$, $R^{13}$, $R^{14}$ and Z are substituents that will not protonate a pseudo-living polymer.

22 Claims, No Drawings

U.S. PATENT DOCUMENTS

| | | |
|---|---|---|
| 7,351,776 B2 | 4/2008 | Tartamella et al. |
| 2004/0147694 A1 | 7/2004 | Sone et al. .................. 526/164 |
| 2006/0004131 A1 | 1/2006 | Ozawa et al. ................ 525/342 |
| 2006/0030677 A1 | 2/2006 | Ozawa et al. ................ 525/342 |
| 2007/0149717 A1 | 6/2007 | Luo et al. |

FOREIGN PATENT DOCUMENTS

| | | |
|---|---|---|
| EP | 0 767 179 | 4/1997 |
| EP | 0 713 885 | 5/1998 |
| EP | 0 863 165 | 9/1998 |
| EP | 0 894 825 | 2/1999 |
| EP | 0 920 886 | 6/1999 |
| EP | 0 957 115 | 11/1999 |
| EP | 1 099 711 | 11/1999 |
| GB | 835752 | 7/1956 |
| JP | 05-051406 A | 3/1993 |
| JP | 05-59103 A | 3/1993 |
| JP | 10-306113 A | 11/1998 |
| JP | 11-035633 A | 2/1999 |
| WO | 95/04090 | 2/1995 |
| WO | 01/34658 | 11/2000 |
| WO | 02/38615 | 11/2000 |

OTHER PUBLICATIONS

R.P. Quirk, A.M. Kells, Poymer International, 2002 vol. 49, pp. 751-756.

"Chemical Modification of Neodymium High cis-1,4-Polybutadiene with Styreneoxide" by Hattori et al., J. Elastomers and Plastics, Issue 23, 135, 1991.

"Functionalization with Styreneoxide" by Hattori et al., Polym. Adv. Techol., Issue 4, 450 1993.

* cited by examiner

MODIFIED POLYMERS PREPARED WITH LANTHANIDE-BASED CATALYSTS

This application is a continuation of U.S. patent application Ser. No. 10/296,082, filed Aug. 13, 2003, now U.S. Pat. No. 6,977,281, which gains priority from International Application No. PCT/US00/30875, filed on Nov. 10, 2000, which gains priority from U.S. Patent Application Ser. No. 60/165,169, filed Nov. 12, 1999.

FIELD OF THE INVENTION

This invention relates to functionalized polymers and processes for functionalizing these polymers. More particularly, these functionalized polymers are prepared with a lanthanide-based catalyst systems and reacted with a functionalizing agent comprising an imine group and a filler-interactive group.

BACKGROUND OF THE INVENTION

Conjugated diene polymers are commonly used in the rubber industry. These polymers are often prepared by using coordination-catalysis techniques because the microstructure of the resulting polymer can be controlled. Polybutadiene having greater than 90 percent of its units in the 1,4-cis configuration can be produced with a coordination catalyst system that includes a nickel, cobalt, or titanium compound, an alkylating agent, and a halogen source. Polymers having this microstructure have a low glass transition temperature ($T_g$), which provides good low-temperature properties. Also, high 1,4-cis polymers have excellent wear resistance and mechanical properties such as reduced cut growth.

The tire industry has been challenged to design tires that have improved rolling resistance, which contributes to better fuel efficiency. Attempts to improve rolling resistance have included alternate tire designs and the use of rubber that has less hysteresis loss. Also, there has been a general trend toward the use of silica as a reinforcing filler. Polymers that interact with the reinforcing fillers of tires have demonstrated less hysteresis loss.

Functionalized polymers prepared with anionic polymerization techniques have demonstrated lower hysteresis loss. They can be functionalized both at initiation and termination. Polybutadiene has been produced by initiating polymerization of 1,3-butadiene with functionalized initiators to provide polymers that have a greater affinity toward carbon black or silica fillers. Anionically polymerized polymers have also been terminated with functionalized terminators to provide polymers that have a greater affinity toward carbon black or silica fillers. Unfortunately, because anionic polymerization does not provide strict control over the polymer microstructure, high 1,4-cis polymers are not obtained.

Coordination catalysis limits the ability to functionalize the resulting polymers because they operate by chemical mechanisms that involve the interaction of several chemical constituents, and often also involve self-termination reactions. As a result, the reaction conditions required to achieve functionalization are difficult to obtain.

Terminating agents, such as organo metal halides, heterocumulene compounds, three-membered heterocyclic compounds, and certain other halogen containing compounds, will react with polymers prepared with a lanthanide-based catalyst system. The resulting functionalized polymers, however, do not have a useful enough affinity toward either organic or inorganic fillers.

Therefore, there is a need in the art to provide functionalizing agents that will react with polymers prepared with coordination catalysts to yield functionalized polymers having a high cis microstructure and an affinity toward carbon black and silica.

SUMMARY OF THE INVENTION

In general the present invention provides a method for preparing a functionalized polymer comprising the steps of preparing a pseudo-living polymer by polymerizing conjugated diene monomer with a lanthanide-based catalyst, where said pseudo-living polymer is characterized by having greater than about 85 percent of the polymer in the cis microstructure and less than about 3 percent of the polymer is in the 1,2- or 3,4-microstructure, and reacting the pseudo-living polymer with at least one functionalizing agent defined by the formula (I) or (II)

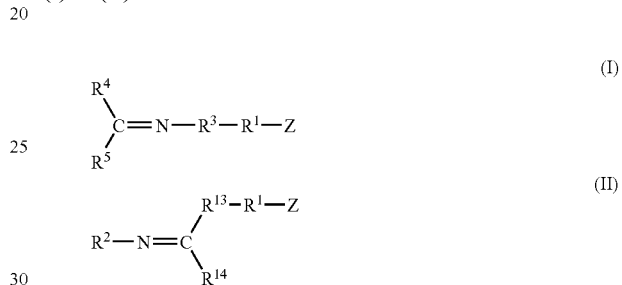

where Z is a substituent that will react or interact with organic or inorganic fillers; $R^1$ is a single bond or a divalent organic group; $R^2$ is a monovalent organic group or a divalent organic group that forms a cyclic organic group with $R^{13}$ or $R^{14}$; $R^3$ is a single bond, a divalent organic group, or a trivalent organic group that forms a cyclic organic group with $R^4$ or $R^5$; $R^{13}$ is a single bond, a divalent organic group, or a trivalent organic group that forms a cyclic organic group with $R^2$ or $R^{14}$; $R^4$ is a monovalent organic group or a divalent organic group that forms a cyclic organic group with $R^3$ or $R^5$; $R^{14}$ is a monovalent organic group or a divalent organic group that forms a cyclic organic group with $R^2$ or $R^{13}$; and $R^5$ is a monovalent organic group or a divalent organic group that forms a cyclic organic group with $R^3$ or $R^4$; with the proviso that each group attached to the imino carbon is attached via a carbon atom and $R^1$, $R^2$ $R^3$, $R^4$, $R^5$, $R^{13}$, $R^{14}$ and Z are substituents that will not protonate a pseudo-living polymer.

The present invention also includes a functionalized polymer prepared by a process comprising the steps of preparing a pseudo-living polymer by polymerizing conjugated monomer with a lanthanide-based catalyst, where said pseudo-living polymer is characterized by having greater than about 85 percent of the polymer in the cis microstructure and less than about 3 percent of the polymer is in the 1,2- or 3,4-microstructure, and reacting the pseudo-living polymer with a functionalizing agent defined by the formula (I) or (II)

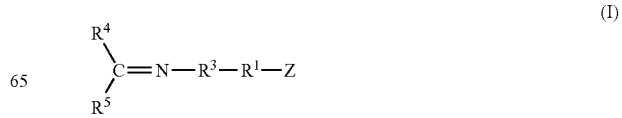

-continued

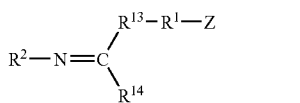
(II)

where Z is a substituent that will react or interact with organic or inorganic fillers; $R^1$ is a single bond or a divalent organic group; $R^2$ is a monovalent organic group or a divalent organic group that forms a cyclic organic group with $R^{13}$ or $R^{14}$; $R^3$ is a single bond, a divalent organic group, or a trivalent organic group that forms a cyclic organic group with $R^4$ or $R^5$; $R^{13}$ is a single bond, a divalent organic group, or a trivalent organic group that forms a cyclic organic group with $R^2$ or $R^{14}$; $R^4$ is a monovalent organic group or a divalent organic group that forms a cyclic organic group with $R^3$ or $R^5$; $R^{14}$ is a monovalent organic group or a divalent organic group that forms a cyclic organic group with $R^2$ or $R^{13}$; and $R^5$ is a monovalent organic group or a divalent organic group that forms a cyclic organic group with $R^3$ or $R^4$; with the proviso that each group attached to the imino carbon is attached via a carbon atom and $R^1$, $R^2$ $R^3$, $R^4$, $R^5$, $R^{13}$, $R^{14}$ and Z are substituents that will not protonate a pseudo-living polymer.

The present invention further includes a vulcanizable composition of matter comprising (a) a rubber component comprising a functionalized polymer prepared by a process comprising the steps of preparing a pseudo-living polymer by polymerizing conjugated monomer with a lanthanide-based catalyst, where said pseudo-living polymer is characterized by having greater than about 85 percent of the polymer in the cis microstructure and less than about 3 percent of the polymer is in the 1,2- or 3,4-microstructure, and reacting the pseudo-living polymer with a functionalizing agent defined by the formula (I) or (II)

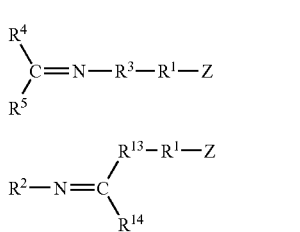

where Z is a substituent that will react or interact with organic or inorganic fillers; $R^1$ is a single bond or a divalent organic group; $R^2$ is a monovalent organic group or a divalent organic group that forms a cyclic organic group with $R^{13}$ or $R^{14}$; $R^3$ is a single bond, a divalent organic group, or a trivalent organic group that forms a cyclic organic group with $R^4$ or $R^5$; $R^{13}$ is a single bond, a divalent organic group, or a trivalent organic group that forms a cyclic organic group with $R^2$ or $R^{14}$; $R^4$ is a monovalent organic group or a divalent organic group that forms a cyclic organic group with $R^3$ or $R^5$; $R^{14}$ is a monovalent organic group or a divalent organic group that forms a cyclic organic group with $R^2$ or $R^{13}$; and $R^5$ is a monovalent organic group or a divalent organic group that forms a cyclic organic group with $R^3$ or $R^4$; with the proviso that each group attached to the imino carbon is attached via a carbon atom and $R^1$, $R^2$ $R^3$, $R^4$, $R^5$, $R^{13}$, $R^{14}$ and Z are substituents that will not protonate a pseudo-living polymer, and (b) a reinforcing filler.

It has now been found that polymers prepared with lanthanide-based catalysts can be functionalized with certain functionalizing agents to produce functionalized polymers that are technologically useful.

DETAILED DESCRIPTION OF ILLUSTRATIVE EMBODIMENTS

The present invention is directed toward novel functionalizing agents, a process for functionalizing polymers prepared with lanthanide-based catalysts, the resulting functionalized polymers, and the use of these functionalized polymers within tires.

The polymers that are functionalized are prepared from lanthanide-based coordination catalyst systems. These polymers are preferably characterized in that greater than about 85 percent of the polymer is in the cis microstructure, less than about 3% of the polymer is in the 1,2- or 3,4-microstructure, and molecular weight distribution of the polymer is less than about 4. Because these polymers have been found to demonstrate some living characteristics, they may be called pseudo-living polymers within this specification.

This invention is not limited to functionalizing a polymer prepared from any particular lanthanide-based catalyst. One useful catalyst includes a lanthanide compound, an alkylating agent, and a source of halogen. The lanthanide compound can include neodymium (Nd) carboxylates including Nd neodecanoate. Also, the lanthanide compound can include the reaction product of a Nd carboxylate and a Lewis base such as acetylacetone. The alkylating agents can generally be defined by the formula $AlR_3$, where each R, which may the same or different, is hydrogen, a hydrocarbyl group, or an alkyl aluminoxy group, with the proviso that at least one R is a hydrocarbyl group. Examples of these alkylating agents include, but are not limited to, trialkyl aluminum, dialkyl aluminum hydride, alkyl aluminum dihydride, and mixtures thereof. Examples of alkylating agents where R is an alkyl aluminoxy group include methyl aluminoxanes. Sources of halogen can include organoaluminum chloride compounds. Catalyst systems that generally include lanthanide compounds and alkylating agents definable by the formula $AlR_3$ are disclosed in U.S. Pat. Nos. 3,297,667, 3,541,063, and 3,794,604, which are incorporated herein by reference.

One particularly preferred catalyst includes (a) the reaction product of Nd carboxylate and acetylacetone, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in U.S. Pat. No. 4,461,883, which is incorporated herein by reference. Another preferred catalyst includes (a) Nd neodecanoate, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in Can. Pat. No. 1,223,396, which is incorporated herein by reference.

Still another preferred lanthanide-based catalyst system includes (a) a lanthanide compound such as Nd carboxylate, (b) an aluminoxane such as methyl aluminoxane, which may optionally be used in conjunction with an alkylating agent such as diisobutylaluminum hydride, and (c) a source of halogen such as diethylaluminum chloride. Neodymium catalysts that include alkyl aluminoxane compounds are described in Japanese Kokai publications 06-211916, 08-073515, 10-306113, and 11-035633, which are incorporated herein by reference. In an especially preferred embodiment of the system with aluminoxanes, the source of halogen is a metal halide of Group I, II, or VII metals. These metal halides include, but are not limited to, $BeCl_2$, $BeBr_2$, $BeI_2$, $MgCl_2$, $MgBr_2$, $MgI_2$, $CaCl_2$, $CaBr_2$, $CaI_2$, $BaCl_2$, $BaBr_2$, $BaI_2$, $ZnCl_2$, $ZnBr_2$, $ZnI_2$, $CdCl_2$, $HgCl_2$, $MnCl_2$, $ReCl_2$, $CuCl_2$, $AgCl_2$, $AuCl$. Other lanthanide-based catalysts and processes for their use are described in U.S. Pat. Nos. 4,444,903, 4,525,549, 4,699,960, 5,017,539, 5,428,119, 5,064,910, and 5,844,050, which are incorporated herein by reference.

Typically, from about 0.0001 to about 1.0 mmol of lanthanide metal are employed per 100 grams of monomer. More preferably, from about 0.001 to about 0.75, and even more preferably from about 0.005 to about 0.5 mmol of lanthanide metal per 100 grams of monomer are employed. The ratio of alkylating agent to lanthanide metal is from about 1:1 to about 1:500, more preferably from about 3:1 to about 250:1, and even more preferably from about 5:1 to about 200:1. The ratio of halogen source to lanthanide metal is from about 0.1:1 to about 30:1, more preferably from about 0.2:1 to about 15:1, and even more preferably from about 1:1 to about 10:1.

Monomers that are polymerized by the lanthanide-based catalysts are conjugated diene monomers that include, but are not limited to, 1,3-butadiene, isoprene, 1,3-pentadiene, 2,3-dimethyl-1,3-butadiene, and myrcene. 1,3-butadiene is most preferred. These conjugated dienes may be used either alone or in combination. If desired, a small amount of monomer other than conjugated dienes can be added. These other monomers include, but are not limited to, aromatic 1,2- or 3,4-compounds such as styrene. The amount of the copolymerizable monomer is not limited, but is usually less than 10 percent by weight, preferably less than 5 percent by weight, and even more preferably less than about 3 percent by weight of the entire polymer.

According to this invention, pseudo-living polymers prepared with lanthanide-based catalysts are reacted with certain functionalizing agents to produce terminally-functionalized polymers. Useful functionalizing agents include imine containing compounds defined by formulas (I) and (II)

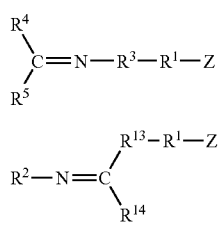

where Z is a filler-interactive substituent that will react with or interact with organic or inorganic fillers, $R^1$ is a single bond or a divalent organic group, $R^2$ is a monovalent organic group, $R^3$ is a single bond or a divalent organic group, $R^{13}$ is a single bond or a divalent organic group, $R^4$ is a hydrogen atom, an amino group, or a monovalent organic group, $R^{14}$ is a hydrogen atom, an amino group, or a monovalent organic group, and $R^5$ is a monovalent organic group, with the proviso that at least one of $R^4$ or $R^5$ in formula (I) is attached to the imine carbon via a carbon atom, and where $R^{13}$ in formula (II) is attached to the imine carbon via a carbon atom. $R^3$ may combine with $R^4$ or $R^5$ to form a cyclic organic group, or $R^2$ may combine with $R^{13}$ or $R^{14}$ to form a cyclic organic group. $R^4$ and $R^5$ may combine to form a cyclic organic group, and $R^{13}$ and $R^{14}$ may also combine to form a cyclic organic group. Consequently, $R^3$ or $R^{13}$ may be trivalent organic groups, and $R^2$, $R^4$, $R^{14}$, or $R^5$ may be divalent organic groups. $R^1$, $R^2$, $R^3$, $R^4$, and $R^5$ are substituents that will not protonate a pseudo-living polymer. As used throughout this specification, substituents that will not protonate a pseudo-living polymer refer to those substituents that will not donate a proton to the polymer in a protolysis reaction.

Preferably, the divalent organic groups are hydrocarbylene groups that contain from 1 to about 20 carbon atoms. More preferably, these hydrocarbylene groups will contain from about 1 to about 10 carbon atoms, and even more preferably from about 2 to about 8 carbon atoms. These hydrocarbylene groups include aliphatic, cycloaliphatic, and aromatic groups including, but not limited to, alkylene, cycloalkylene, substituted alkylene, substituted cycloalkylene, alkenylene, cycloalkenylene, substituted alkenylene, substituted cycloalkenylene, arylene, and substituted arylene. The term "substituted" refers to an organic group, such as a hydrocarbyl group, that replaces a hydrogen atom attached to a carbon within the group. The hydrocarbylene groups may contain hetero atoms including nitrogen (N), oxygen (O), sulfur (S), phosphorous (P), and silicon (Si). When these hydrocarbylene groups include O, they may be referred to as oxo-hydrocarbylene groups, and where they include N, they may be referred to as aza-hydrocarbyl-hydrocarbylene groups.

Some specific examples of hydrocarbylene groups include methylene, ethylene, 1,3-propylene, 1,2-propylene, 1,4-butylene, 1,4-(2-methyl)butylene, 1,5-pentylene, cyclopentylene, phenylene, and 1-(aza-hydrocarbyl)hydrocarbylene.

Preferably, the monovalent organic groups are hydrocarbyl groups that contain from 1 to about 20 carbon atoms. More preferably, these groups include from about 2 to about 10 carbon atoms, and even more preferably from about 3 to about 8 carbon atoms. These hydrocarbyl groups can include, but are not limited to, alkyl, cycloalkyl, substituted alkyl, substituted cycloalkyl, alkenyl, cycloalkenyl, substituted alkenyl, substituted cycloalkenyl, aryl substituted aryl, allyl, aralkyl, alkaryl, and alkynyl and may contain hetero atoms including, but not limited to, N, O, S, P, and Si. When these hydrocarbyl groups include O, they may be referred to as oxo-hydrocarbyl groups, and where they include N, they may be referred to as aza-hydrocarbyl-hydrocarbyl groups. Some specific examples of hydrocarbyl groups include methyl, ethyl, propyl, isopropyl, butyl, 2-methylbutyl, pentyl, hexyl, cyclohexyl, heptyl, octyl, cyclo-octyl, 2-ethylhexyl, 2-propylhexyl, and 1-(aza-hydrocarbyl)hydrocarbyl groups.

Non-limiting examples of imine groups include benzylidene hydrocarbyl amine, N-hydrocarbyl diaryl ketimine, α,α-substituted alkylene aryl amine.

In one particular embodiment, where the filler-interactive group Z contains a silane group such as triethoxysilylpropyl, the functionalizing agents are be defined by the formulas (III) and (IV)

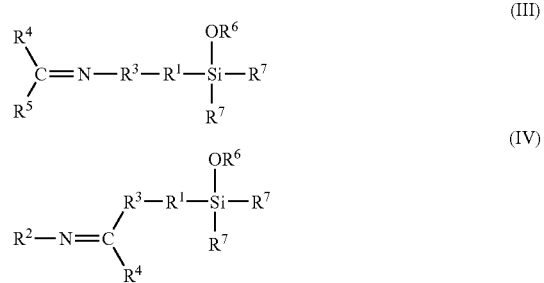

where $R^1$, $R^2$, $R^3$, $R^4$, and $R^5$ are as defined above, $R^6$ is a monovalent organic group, and each $R^7$, which may be the same or different, is a monovalent organic group or a substituent defined by —$OR^8$, where $R^8$ is a monovalent organic group. $R^1$, $R^2$, $R^3$, $R^4$, $R^5$, $R^6$, and $R^7$ are substituents that will not protonate a pseudo-living polymer. Preferably, at least one $R^7$ is —$OR^8$, and even more preferably each $R^7$ is —$OR^8$. The monovalent organic groups are preferably hydrocarbyl groups that contain from 1 to about 20 carbon atoms, more preferably from about 2 to about 10 carbon atoms, and even more preferably from 3 to about 8 carbon atoms.

Specific non-limiting examples of compounds definable by the formulas (III) and (IV) include N-(3-triethoxysilylpropyl)-4,5-dihydroimidazole (TEOSI) and N-(1,3-dimethylbutylidene)-3-triethoxysilyl)-1-propaneamine (HAPEOS).

Those skilled in the art will be able to readily synthesize the silane-containing compounds defined by the formulas (II) and (IV). For example, ketones or aldehydes may be reacted with an amine that contains a carbon-carbon double bond, and the reaction product thereof may be reacted with an alkoxy silicon hydride via hydrosilation.

Dimers, trimers, or even larger oligomers of alkoxy silane compounds can also be employed. For example, a dimer of compounds represented by the formula (III) can be represented by the following formula (V)

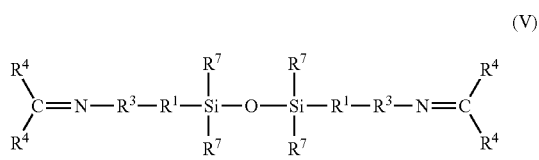

(V)

Because functionalizing agents containing alkoxy silane filler-interactive groups are likely to oligomerize, reference to these compounds will likewise refer to oligomers thereof.

In another embodiment, where the filler-interactive group Z contains a N,N-disubstituted amino phenyl group, functionalizing agents of the present invention are defined by the formulas (VI) and (VII)

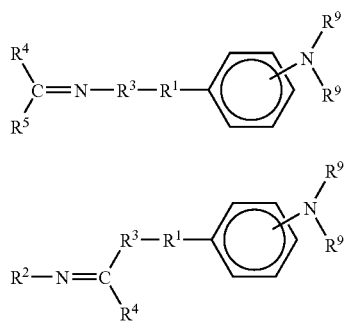

(VI)

(VII)

where $R^1$, $R^2$, $R^3$, $R^4$, $R^5$ are as defined above, and where each $R^9$, which may be the same or different, is a monovalent organic group or amino group, with the proviso that $R^1$, $R^2$, $R^3$, $R^4$, $R^5$, and $R^9$ are substituents that will not protonate a pseudo-living polymer. The monovalent organic groups preferably contain from 1 to about 20 carbon atoms. More preferably, these groups will include from about 2 to about 10 carbon atoms, and even more preferably from about 3 to about 8 carbon atoms.

Non-limiting examples of N,N-disubstituted amino phenyl groups include N,N-diethylaminophenyl, N,N-dimethylaminophenyl, hexamethyleneimin-N-o-phenyl, pyrrolidin-1-o-phenyl.

Non-limiting examples of compounds that are generally definable by the formulas (VI) and (VII) include dialkylaminobenzylidene alkylamines such as dimethylaminobenzylidene ethylamine, diethylaminobenzylidene-butylamine; dialkylaminobenzylidene anilines such as dimethylaminobenzylidene aniline, dimethylaminobenzylidene n-butylaniline (DMAB-BPA), dimethylaminobenzylidene dodecylaniline, dimethylaminobenzylidene methoxyaniline, dimethylaminobenzylidene dimethylaminoaniline; bis(dialkylaminophenyl)methylidene alkylamines such as bis(dimethylaminophenyl) methylidene-butylamine, bis(dimethylaminophenyl)methylidene n-octylamine, bis(diethylaminophenyl)methylidene-butylamine, bis(diethylaminophenyl)methylidene n-octylamine; benzylidene dialkylaminoanilines such as benzylidene dimethylaminoaniline, methoxybenzylidene dimethylaminoaniline, alpha,alpha-disubstituted alkylydene dialkylaminoaniline such as 1-methyl-4-pentene-2-yl-methylidene dimethylaniline, or other alkylidene dialkylaminoanilines such as 1,3-dimethylbutylidene dimethylaniline. Many other compounds are disclosed in U.S. Pat. No. 5,066,729, which is incorporated herein by reference.

Those skilled in the art will be able to readily synthesize the N,N-disubstituted amino phenyl-containing compounds defined by the formulas (VI) and (VII). Also, their synthesis is described in U.S. Pat. No. 5,153,159.

In another embodiment, where the filler-interactive group Z contains an imine group, the functionalizing agent can be defined by the formulas (VIII), (IX), and (X)

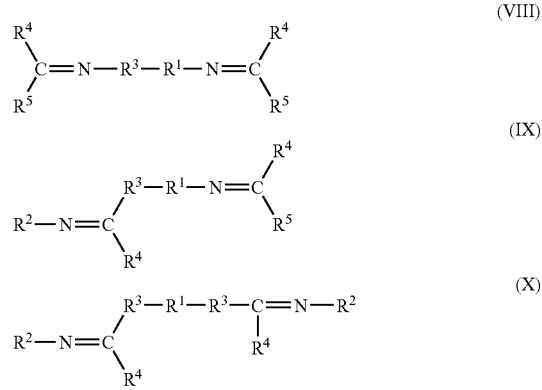

where $R^1$, $R^2$, $R^3$, $R^4$, and $R^5$ are as defined above, with the proviso that at least one of $R^4$ or $R^5$ in formulas (VIII) and (XI) is attached to the imine carbon via a carbon atom. $R^1$, $R^2$, $R^3$, $R^4$, $R^5$, and $R^{10}$ are substituents that will not protonate a pseudo-living polymer.

Non-limiting examples of imine groups include alkylene amines, benzylideneamines, and imidazoles including N-(4, 5-dihydroimidazole) groups. Non-limiting examples of compounds that are generally definable by the formulas (VIII), (IX), and (X) include phenylene bis(dimethylaminobenzylidene amine).

Those skilled in the art will be able to readily synthesize the imine-containing compounds defined by the formulas (VIII), (IX) and (X). For example, the compounds defined by the formula (VIII) may be prepared by reacting a diamine with desired ketone or aldehyde compound.

In another embodiment, where the filler-interactive group Z contains a cyclic amino group, the functionalizing agents can be defined by the formulas (XI) and (XII)

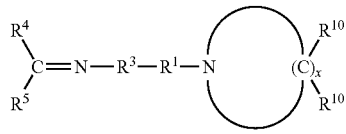

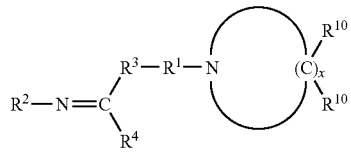

where $R^1$, $R^2$, $R^3$, $R^4$, $R^5$ and $R^{10}$ are as defined above, where two $R^{10}$ groups can join to form a bicyclo structure, and x is an integer from 4 to about 20. In forming the bicyclo structure, two $R^{10}$ groups attached to the same carbon atom may join or, in alternatively, $R^{10}$ groups on separate ring carbons may join to form a bicyclo group. $R^1$, $R^2$, $R^3$, $R^4$, $R^5$, and $R^{10}$ are substituents that will not protonate a pseudo-living polymer.

Non-limiting examples of cyclic amino groups include 1-hexamethyleneimino, 1-pyrolidino, 1-piperidino, 1-dodecamethyleneimino, and 4-substituted 1-piperazino groups. Non-limiting examples of compounds that are generally definable by the formulas (XI) and (XII) include benzylidene (1-hexamethyleneimino)aniline, benzylidene (1-pyrolidino)aniline, dimethylaminobenzylidene (1-hexamethyleneimino)aniline, dimethylaminobenzylidene (1-pyrolidino)aniline, (1-hexamethyleneimino)benzylidene aniline, and (1-pyrolidino)benzylidene aniline.

In another embodiment where the filler-interactive group Z contains a cyclic amino group, the functionalizing agents can be defined by the formulas (XIII) and (XIV)

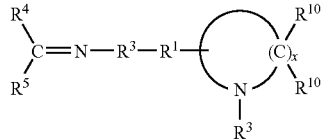

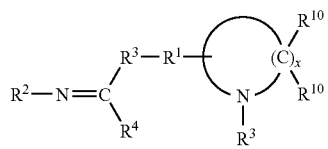

where $R^1$, $R^2$, $R^3$, $R^4$, $R^5$, $R^{10}$ and x are as defined above. The cyclic amino group can include heteroatoms within the cyclic ring. In other words, the carbon atom designated C can be replaced by O, N, S, Si, or P.

A non-limiting example of cyclic amino groups includes 3-(1-methyl)pyrolidino group. Non-limiting examples of compounds that are definable by the formulas (XIII) and (XIV) include benzylidene 4-(1-n-butyl piperazino)-methyl aniline, benzylidene ((3-(1-methyl)pyrolidino)methyl) aniline, 4-(4-(1-n-butyl)piperazino)methyl benzylidene aniline, 4-((3-(1-methyl)pyrolidino)methyl)benzylidene aniline.

Those skilled in the art will be able to readily synthesize the cyclic amino-containing compounds defined by the formulas (XI), (XII), (XIII) and (XIV). For example, a cyclic amine-containing primary amine can be reacted with a desired ketone or aldehyde.

Epoxy compounds that will not protonate a pseudo-living polymer can be used in combination with the foregoing functionalizing agents to react with pseudo-living polymers to form blends of functionalized polymers. These epoxy compounds include, but are not limited to, styrene oxide, epoxidized soy bean oil, glycidyl(meth)acrylate, diglycidyl ether, ethylene oxide, propylene oxide, 1,2-epoxybutane, 1,2-epoxyisobutane, 2,3-epoxybutane, 1,2-epoxyhexane, 1,2-epoxyoctadecane, 1,2-epoxyeicosane, 1,2-epoxy-2-pentylpropane, 3,4-epoxy-1-butene, 1,2-epoxy-5-hexene, 1,2-epoxy-9-decene, 1,2-epoxycyclopentane, 1,2-epoxycyclohexane, 1,2-epoxycyclododecane, 1,2-epoxyethylbenzene, 1,2-epoxy-1-methoxy-2-methylpropane, glycidyl methyl ether, glycidyl ethyl ether, glycidyl isopropyl ether, glycidyl phenyl ether, glycidyl butyl ether, ethyleneglycol diglycidyl ether, neopentylglycol diglycidyl ether, trimethylolpropane triglycidyl ether, glycerol triglycidyl ether, polypropyleneglycol diglycidyl ether, polyethyleneglycol diglycidyl ether, sorbitol polyglycidyl ether, N,N-diglycidylaniline, N,N-diglycidyltoluidine, N,N-diglycidyl-3-glycidoxyaniline, N,N-diglycidyl-2-glycidoxyaniline, bis(N,N-diglycidylamino)diphenylmethane, tris(2,3-epoxypropyl) isocyanulate, N,N-diglycidylbutylamine, and mixtures thereof.

The functionalized polymers are prepared by contacting one or more of the foregoing functionalizing agents, including mixtures thereof, with a pseudo-living polymer. If a solvent is employed, it is preferable to employ a solvent in which both the pseudo-living polymer and the functionalizing agent are soluble, or in which they may both be suspended. Preferably, this contacting takes place at a temperature of less than 160° C., and more preferably at a temperature from about 20° C. to about 100° C. Further, the reaction time is preferably from about 0.1 to about 10 hours, and more preferably from about 0.2 to about 5 hours.

The amount of functionalizing agent used can vary. Preferably, from about 0.01 to about 200 moles of functionalizing agent per mole of lanthanide, and more preferably, from about 0.1 to about 150 moles per mole of lanthanide are employed.

The reaction between the pseudo-living polymer and the functionalizing agent is quenched by using reagents such as, but not limited to, isopropyl alcohol, methanol, and water. Stabilizers, such as 2,6-di-tert-butyl-4-methylphenol (BHT), can be added during or after quenching.

Before quenching the resulting polymer, however, certain reactive compounds can be added to provide additional functionality to the polymer. These reactive compounds include those that will undergo addition reactions with metal alkoxides or metal amides. Addition of a protic quenching agent is believed to remove the metal via a substitution reaction and thereby leave a lanthanide or aluminum amino group at the polymer chain end. A reaction between the metal amide and the metal amide-reactive compound before quenching is believed to provide additional functionality.

The polymer product can be recovered by using any technique that is commonly employed in the art. For example, the polymer product can be coagulated in a hindered solvent such as isopropyl alcohol, and then dried in a hot air oven or hot mill. Alternatively, the polymer product can be recovered by steam desolventization and successive hot air drying or drying on a hot mill or the like. A processing oil can be added prior to finishing.

The resulting functionalized polymer can be represented by the formula (XV)

(XV)

where $R^1$ and $R^3$ are as defined above, and $A^*$ is the residue of the imino portion of the functionalizing agent that has undergone an addition reaction with a pseudo-living polymer, and is polymer having a cis microstructure that is greater than about 85%, a 1,2- or 3,4-unit content that is less than about 3%, and a molecular weight distribution that is less than about 5. More preferably, the polymer has a cis microstructure that is greater than about 90%, a 1,2- or 3,4-unit content that is less than about 2%, and a molecular weight distribution that is less than about 4.

Polymers carrying alkoxysilane functionality may couple via a condensation reaction. For example, polymers represented by the formula (XV) may condense to form a coupled polymer that is represented by the following formula (XVI)

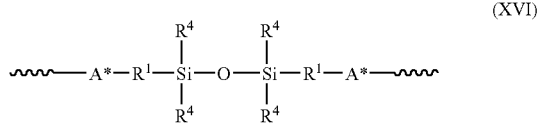

(XVI)

where $A^*$, $R^1$ and $R^4$ are as defined above.

Reference to the functionalized polymers will likewise include the condensation products thereof. In the event that any $R^4$ is $OR^5$, it may likewise couple with another functionalized polymer. Advantageously, the coupling of functionalized polymers where Z is a silane group improves the cold flow resistance of the polymers.

The functionalized polymers of this invention can advantageously be used in the manufacture of various tire components including, but not limited to, tire treads, side walls, subtreads, and bead fillers. They can be used as all or part of the elastomeric component of a tire stock. In one embodiment, the functionalized polymers comprise greater than about 10 percent by weight (pbw), more preferably, greater than about 20 pbw, and even more preferably greater than about 30 pbw, of the elastomeric component of the tire stock. Addition of the functionalized polymers to a tire stock does not alter the type or amount of other ingredients typically included within these vulcanizable compositions of matter. Accordingly, practice of this invention is not limited to any particular vulcanizable composition of matter or tire compounding stock.

Typically, tire stocks include an elastomeric component that is blended with reinforcing fillers and at least one vulcanizing agent. Accelerators, oils, waxes, fatty acids and processing aids are often included. Vulcanizable compositions of matter containing synthetic rubbers typically include antidegradants, processing oils, zinc oxide, optional tackifying resins, optional reinforcing resins, optional peptizers, and optional scorch inhibiting agents.

The functionalized polymers of this invention may be used in conjunction with other rubbers to form the elastomeric component of a tire stock. These other rubbers may include natural rubber, synthetic rubber, or both. Examples of synthetic rubber include synthetic poly(isoprene), poly(styrene-co-butadiene), poly(butadiene), poly(styrene-co-butadiene-co-isoprene) and mixtures thereof.

Reinforcing fillers may include both organic and inorganic fillers. Organic fillers include, but are not limited to carbon black, and inorganic fillers include, but are not limited to, silica, alumina, aluminum hydroxide, and magnesium hydroxide. Reinforcing fillers are typically employed in an amount from about 1 to about 100 parts by weight per 100 parts by weight rubber (phr), and preferably from about 20 to about 80 parts by weight phr, and more preferably from about 40 to about 80 parts by weight phr based on the total weight of all reinforcing fillers employed. Typically, when an inorganic filler is used, it is used in combination with organic fillers. In these embodiments, the total amount of reinforcing filler will include from about 30 to about 99 parts by weight inorganic filler and 1 to about 70 parts by weight organic filler, based on 100 parts by weight total filler. More preferably, the total filler will include from about 50 to about 95 parts by weight inorganic filler and from about 5 to about 50 parts by weight organic filler based on 100 parts by weight filler.

Carbon blacks may include any commonly available carbon black, but those having a surface area (EMSA) of at least 20 m²/g, and more preferably at least 35 m²/g up to 200 m²/g or higher, are preferred. Surface area values used in this application are those determined by ASTM test D-1765 by using the cetyltrimethyl-ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m²/g, preferably about 100 to about 250 m²/g, and more preferably about 150 to about 220 m²/g. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Typically, a coupling agent is added when silica is used. One coupling agent conventionally used is bis-[3(triethoxysilyl)propyl]-tetrasulfide, which is commercially available under the tradename SI69 (Degussa, Inc.; New York, N.Y.). Additional coupling agents may include bis(3-(triethoxysilyl)propyl)trisulfide, bis(3-(triethoxysilyl)propyl)disulfide, 3-mercaptopropyltriethoxysilane, bis(3-(trimethoxysilyl)propyl)tetrasulfide, bis(3-(trimethoxysilyl)propyl)trisulfide, bis(3-(trimethoxysilyl)propyl)disulfide, 3-mercaptopropyltrimethoxysilane, 3-(trimethoxysilyl)propyl)diethylthiocarbamyl tetrasulfide, and 3-(trimethoxysilyl)propyl)benzothiazyl tetrasulfide. These agents are typically employed in an amount from about 1 to about 20 phr, and more preferably from about 3 to about 15 phr. Advantageously, less coupling agent is required when the functionalized polymers of this invention, which include a silane functionality, are employed.

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3rd Edition, Wiley Interscience, N.Y. 1982, Vol. 20, pp.

365-468, particularly VULCANIZATION AGENTS AND AUXILIARY MATERIALS pp. 390-402, or *Vulcanization* by A. Y. Coran, ENCYCLOPEDIA OF POLYMER SCIENCE AND ENGINEERING, $2^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The polyolefin additives are preferably added during preparation of the initial masterbatch. Once this initial masterbatch is prepared, the vulcanizing agents are blended into the composition. The composition can then be processed into tire components according to ordinary tire manufacturing techniques including standard rubber curing techniques. Rubber compounding techniques and the additives employed therein are generally known as disclose in *The Compounding and Vulcanization of Rubber*, by Stevens in RUBBER TECHNOLOGY SECOND EDITION (1973 Van Nostrand Reihold Company). Pneumatic tires can be made according to U.S. Pat. Nos. 5,866,171; 5,876,527; 5,931,211; and 5,971,046, which are incorporated herein by reference.

The functionalized polymers of this invention can also be used in the manufacture of hoses, belts, shoe soles, window seals, other seals, vibration damping rubber, and other industrial products.

In order to demonstrate the practice of the present invention, the following examples have been prepared and tested as described in the Examples Section disclosed hereinbelow. The examples should not, however, be viewed as limiting the scope of the invention. The claims will serve to define the invention.

EXAMPLES

A catalyst was prepared by mixing 0.45 g of 1,3-butadiene monomer in hexanes, 0.28 mmol of neodymium neodecanoate in hexanes, 27.5 mmol of methylaluminoxane in toluene, and 5.77 mmol of diisobutylaluminum hydride in hexanes within a dried and nitrogen purged bottle equipped with a rubber septum. After two minutes of contact, 1.10 mmol of diethylaluminum chloride in hexanes was added to the mixture. The mixture was then aged at room temperature for about 18 minutes.

Polybutadiene polymer was prepared by mixing the catalyst solution prepared above with 611 g of 1,3-butadiene monomer in about 3,460 g of hexanes at 27° C. within a stainless steel reactor equipped with an agitator and a jacket to control temperature.

The functionalizing agents identified in Table I, each containing an imine reactive group, were added to the respective samples in an amount and at a temperature as set forth in Table I. The functionalizing agent was allowed to react for the time specified, quenched with a small amount of isopropyl alcohol and 2,6-t-butyl 4-methyl phenol (BHT) in hexanes, and then the polymer was isolated by coagulation in isopropyl alcohol and successive drum drying. Example 1, which was not functionalized with the imine functionalizing agent, was determined to have a 93 percent cis structure by using FTIR analysis.

Table I sets forth the Mooney Viscosity (ML 1+4@ 100° C.), the Mooney relaxation to 20% torque (T-80), the number average molecular weight ($M_n$), the weight average molecular weight ($M_w$), and molecular weight distribution as determined by GPC analysis with universal calibration for polybutadiene based on polystyrene.

This mixture was agitated for about 8 minutes at 27° C., and then the jacket temperature was increased to 82° C. and agitation continued for another 42 minutes, at which time the temperature was lowered to 70° C. Approximately 370 g of the polymer cement was sampled into seven separate dried and nitrogen-purged bottles, which are identified as Samples 1-9 in Table I. Polymer Sample 10 was obtained commercially under the tradename BR01™ (JSR Corp.; Tokyo, Japan).

TABLE I

| | Polymer Samples | | | | | | | | | |
|---|---|---|---|---|---|---|---|---|---|---|
| | 1 | 2 | 3 | 4 | 5 | 6 | 7 | 8 | 9 | 10 |
| Functionalizing Agent | None | DMAB-BPA | DMAB-BPA | DMAB-BPA | TEOSI | TEOSI | TEOSI | None | None | None |
| Amount of functionalizing agent (eq/Nd) | — | 25 | 50 | 50 | 25 | 50 | 50 | — | — | — |
| Reaction Temp (° C.) | — | — | 50 | 50 | 50 | 50 | 50 | — | — | — |
| Reaction Time (min) | — | — | 180 | 900 | 180 | 180 | 900 | — | — | — |
| ML1 + 4 @ 100° C. | 44 | 48 | 48 | 49 | 74 | 57 | 63 | 32 | 55 | 43 |
| T-80 (s) | 4.0 | 4.0 | 4.0 | 4.0 | 5.3 | 4.3 | 5.1 | 3.3 | 4.0 | 8.5 |
| Mn (kg/mol) | 140 | 141 | 140 | 135 | 144 | 133 | 141 | 122 | 146 | 77 |
| Mw (kg/mol) | 274 | 274 | 277 | 280 | 294 | 277 | 277 | 240 | 307 | 306 |
| Mw/Mn | 2.0 | 1.9 | 2.0 | 2.1 | 2.0 | 2.1 | 2.0 | 1.97 | 2.09 | 4.0 |
| % functionality | 0.0 | 62.8 | 60.7 | 58.7 | N/A | N/A | N/A | 0 | 0 | 0 |

Sample polymers 4, 7, 8, 9, and 10 were individually compounded into rubber formulations with carbon black (N339) as a filler. Samples 1, 3, and 6 were individually compounded into rubber formulations with silica (Nipsil VN3™; Nippon Silica; Japan). An initial masterbatch was blended within an internal mixer at an initial temperature of about 110° C. for about 3.5 minutes. The masterbatch was allowed to cool and then re-milled within the same internal mixer for about 2 minutes. Then, a cure system was added while the compound was continually processed within the internal mixer at a temperature of about 80° C. for about 1 minute. The compounding recipes that were employed are set forth in Tables II and III.

TABLE II

COMPOUNDING RECIPE WITH CARBON BLACK

| Ingredient | Parts per Hundred Rubber |
|---|---|
| Elastomer | 100 |
| Aromatic Oil | 10 |
| Paraffin Oil | 1.5 |
| Carbon Black | 50 |
| Stearic Acid | 2 |
| Antioxidant | 1 |
| Masterbatch Total | 164.5 |
| Zinc Oxide | 2 |
| Sulfur | 1.3 |
| Accelerators | 1.2 |
| Total | 169.0 |

TABLE III

COMPOUNDING RECIPE WITH SILICA

| Ingredient | Parts per Hundred Rubber |
|---|---|
| Elastomer | 100 |
| Aromatic Oil | 10 |
| Silica | 50 |
| Stearic Acid | 2 |
| Antioxidant | 1 |
| Masterbatch Total | 163 |
| Zinc Oxide | 2.5 |
| Sulfur | .03 |
| Accelerators | 2.5 |
| Total | 171.5 |

Once compounded, each formulation was press cured at about 145° C. for about 33 minutes. The cured samples were then analyzed to determine tensile strength at break, moduli, and elongation at break according to JIS-K6301. Bound rubber was measured by immersing finely shredded uncured rubber specimens into toluene at room temperature. After 40 hours, the composition was filtered and bound rubber was calculated from the weight of the dried sample compared to other insoluble ingredients. Also, the samples were tested to determine tan δ at 50° C. (frequency at 31.4 rad/s and 3% strain).

The percent functionality of the polymer was obtained from the area ratios of UB and RI chromatograms and the number average molecular weight of the polymer ($M_n$) obtained by GPC by using universal calibration for polystyrene and high cis butadiene based on polystyrene standards. The following three assumptions were made: (1) the UV absorbance of an end-functional group on a n-butyllithium (n-BuLi) initiated polymer was the same as the UV absorbance of the end-functional group on a lanthanide-catalyzed polymer, (2) n-BuLi initiated polymers are 100% functionalized, and (3) the area ratio of UV/RI is a linear function of the inverse of the $M_n$ of the polymer. Pursuant to the method employed, a calibration curve of UV/RI area ratio (A) and $M_n$ of polymers that were initiated with n-BuLi and terminated with the same imine compound was established according to the following formula: $A = a(1/M_n) + b$ where $A_{(BuLi, endgroup)} = A_{(BuLi, polymer)} - A_{(BuLi-backbone)} = (a_{(polymer)} - a_{(backbone)})(1/M_n) + (b_{(polymer)} - b_{(backbone)})$. Parameters a and b were obtained by least square linear fitting of GPC data of n-BuLi initiated and imine terminated polymers and n-BuLi initiated and alcohol terminated polymers, with 3 different molecular weights. The percent functionalities (F) of unknown polymers initiated by lanthanide catalysts were obtained from GPC data of the functionalized, unknown polymer and the corresponding unfunctionalized (base) polymer according to the following formula: $F = A_{(unknown, endgroup, M)} / A_{(BuLi, endgroup, M)} = (A_{(unknown, polymer, M)} - A_{(unknown, backbone, M)}) / [(a_{(polymer)} - a_{(backbone)})(1/M) + (b_{(polymer)} - b_{(backbone)})]$.

The results of testing the vulcanizates filled with carbon black are set forth in Table IV, and the results of testing the vulcanizates filled with silica are set forth in Table V. The data in Table IV, except for Mooney Viscosity (ML1+4@100° C.), has been indexed to the vulcanizates prepared by using polymer Sample 10, and the data in Table V, except for Mooney Viscosity, has been indexed to the vulcanizates prepared by using polymer Sample 1. The polymer sample labeled A is a weighted average between sample polymers 8 and 9 calculated to provide Mooney Viscosity (ML1+4@100° C.) of about 44.

TABLE IV

| | Polymer Samples | | | | | |
|---|---|---|---|---|---|---|
| | 4 | 7 | 8 | 9 | 10 | A |
| ML1 + 4 @ 100° C. | 49 | 63 | 32 | 55 | 43 | 44 |
| Bound Rubber (index) | 80 | 132 | 61 | 73 | 100 | 67 |
| Tan δ at 50° C. (index) | 125 | 131 | 110 | 132 | 100 | 120 |
| Tensile Strength at Break at 23° C. (MPa)(index) | 101 | 87 | 107 | 109 | 100 | 108 |
| 300% Modulus at 23° C. (MPa) (index) | 103 | 120 | 103 | 118 | 100 | 111 |
| Elongation at Break at 23° C. (%) (index) | 96 | 79 | 101 | 93 | 100 | 97 |
| Tensile Strength at Break at 100° C. (MPa) (index) | 79 | 97 | 91 | 87 | 100 | 89 |
| 300% Modulus at 100° C. (MPa) (index) | 101 | 120 | 104 | 109 | 100 | 106 |
| Tensile Strength at Break at 100° C. (MPa) (index) | 80 | 83 | 90 | 82 | 100 | 86 |

| | Polymer Samples | | |
|---|---|---|---|
| | 1 | 3 | 6 |
| ML1 + 4 @ 100° C. | 44 | 48 | 57 |
| Bound Rubber (index) | 100 | 230 | 593 |
| Tan δ at 50° C. (index) | 100 | 112 | 125 |
| Tensile Strength at Break at 23° C. (MPa) (index) | 100 | 112 | 69 |
| 300% Modulus at 23° C. (MPa) (index) | 100 | 107 | 116 |
| Elongation at Break at 23° C. (%) (index) | 100 | 102 | 73 |
| Tensile Strength at Break at 100° C. (MPa) (index) | 100 | 98 | 52 |
| 300% Modulus at 100° C. (MPa) (index) | 100 | 116 | n/a |
| Tensile Strength at Break at 100° C. (MPa) (index) | 100 | 86 | 42 |

Various modifications and alterations that do not depart from the scope and spirit of this invention will become apparent to those skilled in the art. This invention is not to be duly limited to the illustrative embodiments set forth herein.

What is claimed is:

1. A functionalized polymer prepared by a process comprising the steps of:
    preparing a pseudo-living polymer by polymerizing conjugated monomer with a lanthanide-based catalyst, where said pseudo-living polymer is characterized by having greater than about 85 percent of the polymer in the 1,4-cis microstructure and less than about 3 percent of the polymer is in the 1,2- or 3,4-microstructure; and
    reacting the pseudo-living polymer with a functionalizing agent defined by the formula (I) or (II)

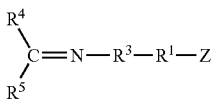

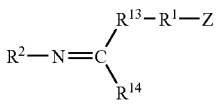

where Z is a substituent that will react or interact with organic or inorganic fillers; $R^1$ is a single bond or a divalent organic group; $R^2$ is a monovalent organic group or a divalent organic group that forms a cyclic organic group with $R^{13}$ or $R^{14}$; $R^3$ is a single bond, a divalent organic group, or a trivalent organic group that forms a cyclic organic group with $R^4$ or $R^5$; $R^{13}$ is a single bond, a divalent organic group, or a trivalent organic group that forms a cyclic organic group with $R^2$ or $R^{14}$; $R^4$ is a monovalent organic group or a divalent organic group that forms a cyclic organic group with $R^3$ or $R^5$; $R^{14}$ is a monovalent organic group or a divalent organic group that forms a cyclic organic group with $R^2$ or $R^{13}$; and $R^5$ is a monovalent organic group or a divalent organic group that forms a cyclic organic group with $R^3$ or $R^4$; with the proviso that each group attached to the imino carbon is attached via a carbon atom and $R^1$, $R^2 R^3$, $R^4$, $R^5$, $R^{13}$, $R^{14}$ and Z are substituents that will not protonate a pseudo-living polymer.

2. The polymer of claim 1, where the pseudo-living polymer has a molecular weight distribution that is less than about 4.

3. The polymer of claim 2, where the pseudo-living polymer includes poly(butadiene).

4. The polymer of claim 1, where Z includes a silane group, an N,N-disubstituted amino phenyl group, an imine group, or a cyclic amino group.

5. The polymer of claim 1, where the functionalizing agent is present in an amount of from about 0.01 to about 200 moles of functionalizing agent per mole of lanthanide-based catalyst.

6. The polymer of claim 1, where the functionalizing agent comprises N-(3-triethoxysilylpropyl)-4,5-dihydroimidazole, N-(1,3-dimethylbutylidene)-3-triethoxysilyl)-1-propaneamine, oligomers thereof, or mixtures thereof; dimethylaminobenzylidene ethylamine, diethylaminobenzylidene butylamine; dimethylaminobenzylidene aniline, dimethylaminobenzylidene n-butylaniline, dimethylaminobenzylidene dodecylaniline, dimethylaminobenzylidene methoxyaniline, dimethylaminobenzylidene dimethylaminoaniline; bis(dimethylaminophenyl)methylidene butylamine, bis(dimethylaminophenyl)methylidene n-octylamine, bis(diethylaminophenyl)methylidene butylamine, bis(diethylaminophenyl)methylidene n-octylamine, benzylidene dimethylaminoaniline, methoxybenzylidene dimethylaminoaniline, 1-methyl-4-pentene-2-yl-methylidene dimethylaniline, 1,3-dimethylbutylidene dimethylaniline, or mixtures thereof; phenylene bis(dimethylaminobenzylidene amine); benzylidene(1-hexamethyleneimino)aniline, benzylidene(1-pyrrolidino) aniline, dimethylaminobenzylidene (1-hexamethyleneimino)aniline, dimethylaminobenzylidene (1-pyrrolidino)aniline, (1-hexamethyleneimino)benzylidene aniline, (1-pyrrolidino)benzylidene aniline, benzylidene((4-n-butyl-1-piperazino)methyl)aniline, benzylidene((3-(1-methyl)pyrrolidino)methyl)aniline, ((4-n-butyl-1-piperazino) methyl)benzylidene aniline, or ((3-(1-methyl)pyrrolidino) methyl)benzylidene aniline.

7. The polymer of claim 1, where the functionalizing agent can be defined by the formula (III) or (IV)

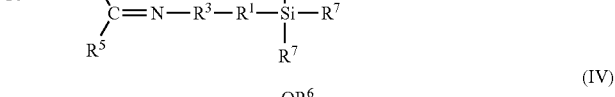

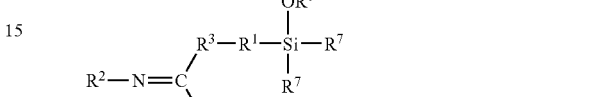

where $R^1$, $R^2$, $R^3$, $R^4$, and $R^5$ are as defined above, $R^6$ is a monovalent organic group, and each $R^7$, which may be the same or different, is a monovalent organic group or a substituent defined by $—OR^8$, where $R^8$ is a monovalent organic group, and where $R^1$, $R^2$, $R^3$, $R^4$, $R^5$, $R^6$ and $R^7$ are substituents that will not protonate a pseudo-living polymer.

8. The polymer of claim 1, where the functionalizing agent comprises N-(3-triethoxysilylpropyl)-4,5-dihydroimidazole, N-(1,3-dimethylbutylidene)-3-triethoxysilyl)-1-propaneamine, oligomers thereof, or mixtures thereof.

9. The polymer of claim 1, where the functionalizing agent can be defined by the formula (V)

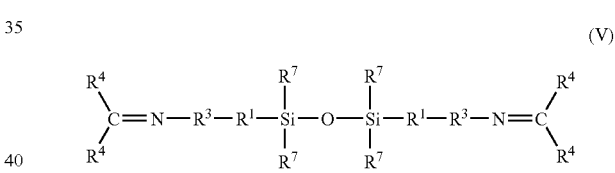

where $R^1$, $R^3$, and $R^4$, are as defined above, and each $R^7$, which may be the same or different, is a monovalent organic group or a substituent defined by $—OR^8$, where $R^8$ is a monovalent organic group, and where $R^1$, $R^3$, $R^4$, and $R^7$ are substituents that will not protonate a pseudo-living polymer.

10. The polymer of claim 1, where the functionalizing agent can be defined by the formula (VI) or (VII)

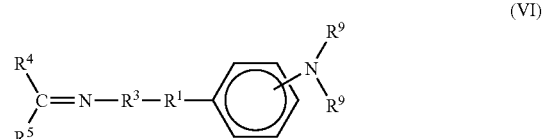

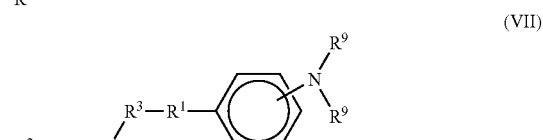

where $R^1$, $R^2$, $R^3$, $R^4$, $R^5$ are as defined above, and where each $R^9$, which may be the same or different, is a monovalent organic group or amino group, with the proviso that $R^1$, $R^2$, $R^3$, $R^4$, $R^5$, and $R^9$ are substituents that will not protonate a pseudo-living polymer.

11. The polymer of claim 1, where the functionalizing agent comprises dimethylaminobenzylidene ethylamine, diethylaminobenzylidene butylamine; dimethylaminobenzylidene aniline, dimethylaminobenzylidene n-butylaniline, dimethylaminobenzylidene dodecylaniline, dimethylaminobenzylidene methoxyaniline, dimethylaminobenzylidene dimethylaminoaniline; bis(dimethylaminophenyl)methylidene butylamine, bis(dimethylaminophenyl)methylidene n-octylamine, bis(diethylaminophenyl)methylidene butylamine, bis(diethylaminophenyl)methylidene n-octylamine, benzylidene dimethylaminoaniline, methoxybenzylidene dimethylaminoaniline, 1-methyl-4-pentene-2-yl-methylidene dimethylaniline, 1,3-dimethylbutylidene dimethylaniline, or mixtures thereof.

12. The polymer of claim 1, where the functionalizing agent can be defined by the formula (XIII), (IX), or (X)

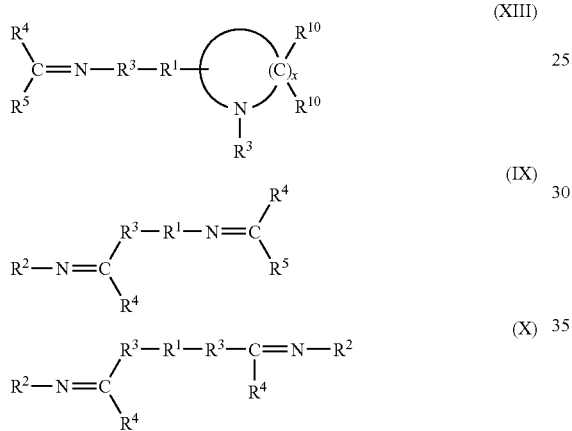

where $R^1$, $R^2$, $R^3$, $R^4$, and $R^5$ are as defined above, with the proviso that at least one of $R^4$ or $R^5$ in formulas (XIII) and (IX) is attached to the imine carbon via a carbon atom, and with the proviso that $R^1$, $R^2$, $R^3$, $R^4$, and $R^5$, are substituents that will not protonate a pseudo-living polymer.

13. The polymer of claim 1, where the functionalizing agent comprises phenylene bis(dimethylaminobenzylidene amine).

14. The polymer of claim 1, where the functionalizing agent can be defined by the formula (XI), (XII), (XIII) or (XIV)

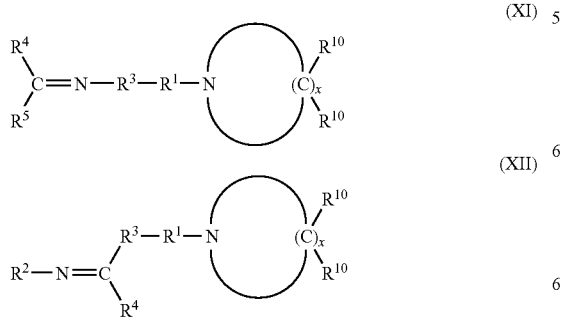

-continued

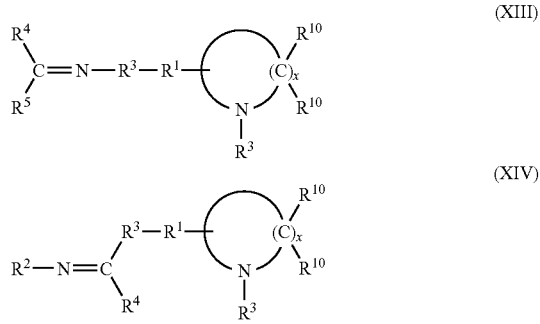

where $R^1$, $R^2$, $R^3$, $R^4$, and $R^5$ are as defined above, where each $R^{10}$, which may be the same or different, is a monovalent organic group, where two $R^{10}$ groups can optionally join to form a bicyclo structure, x is an integer from 4 to about 20, and where $R^1$, $R^2$, $R^3$, $R^4$, $R^5$, and $R^{10}$ are substituents that will not protonate a pseudo-living polymer.

15. The polymer of claim 1, where the functionalizing agent comprises benzylidene(1-hexamethyleneimino) aniline, benzylidene(1-pyrrolidino)aniline, dimethylaminobenzylidene(1-hexamethyleneimino)aniline, dimethylaminobenzylidene(1-pyrrolidino)aniline, (1-hexamethyleneimino)benzylidene aniline, (1-pyrrolidino) benzylidene aniline, benzylidene 4-(1-n-butyl-1-piperazino) methylaniline, benzylidene((3-(1-methyl)pyrrolidino)methyl)aniline, 4-(4-(1-n-butyl)piperazino)methyl benzylidene aniline, or 4-((3-(1-methyl)pyrrolidino)methyl)benzylidene aniline.

16. A vulcanizable composition of matter comprising:
(a) a rubber component comprising a functionalized polymer prepared by a process comprising the steps of
preparing a pseudo-living polymer by polymerizing conjugated monomer with a lanthanide-based catalyst, where said pseudo-living polymer is characterized by having greater than about 85 percent of the polymer in the 1,4-cis microstructure and less than about 3 percent of the polymer is in the 1,2- or 3,4- microstructure; and
reacting the pseudo-living polymer with a functionalizing agent defined by the formula (I) or (II)

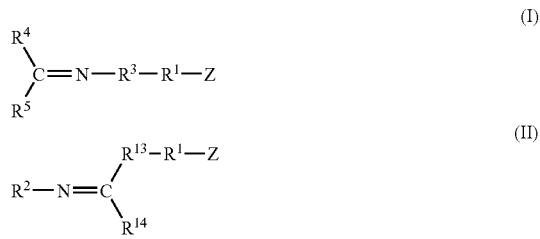

where Z is a substituent that will react or interact with organic or inorganic fillers; $R^1$ is a single bond or a divalent organic group; $R^2$ is a monovalent organic group or a divalent organic group that forms a cyclic organic group with $R^{13}$ or $R^{14}$; $R^3$ is a single bond, a divalent organic group, or a trivalent organic group that forms a cyclic organic group with $R^4$ or $R^5$; $R^{13}$ is a single bond, a divalent organic group, or a trivalent organic group that forms a cyclic organic group with $R^2$ or $R^{14}$; $R^4$ is a monovalent organic group or a divalent organic group that forms a cyclic organic group with $R^3$ or $R^5$; $R^{14}$ is a monovalent organic group or a divalent organic group that forms a cyclic organic group with $R^2$ or $R^{13}$; and $R^5$ is a monovalent organic group or a divalent organic group that forms a cyclic organic group with $R^3$ or $R^4$; with the proviso that each group attached to the imino carbon is attached via a carbon atom and $R^1$, $R^2$ $R^3$, $R^4$, $R^5$, $R^{13}$, $R^{14}$ and Z are substituents that will not protonate a pseudo-living polymer; and (b) a reinforcing filler.

17. The vulcanizable composition of claim 16, where the pseudo-living polymer has a molecular weight distribution that is less than about 4.

18. The vulcanizable composition of claim 17, where the pseudo-living polymer is poly(butadiene).

19. The vulcanizable composition of claim 16, where Z is a silane group, an N,N-disubstituted amino phenyl group, an imine group, or a cyclic amino group.

20. The vulcanizable composition of claim 16, where the functionalizing agent is present in an amount of from about 0.01 to about 200 moles of functionalizing agent per mole of lanthanide-based catalyst.

21. The vulcanizable composition of claim 16, where the inorganic filler comprises silica.

22. A tire tread prepared from the vulcanizable composition of claim 16.

* * * * *